United States Patent [19]

Sato

[11] 4,197,452
[45] Apr. 8, 1980

[54] COUNTERS RESET TO ZERO BY PUSH BUTTONS

[75] Inventor: Susumu Sato, Tokyo, Japan

[73] Assignee: Tamura Electric Works, Ltd., Japan

[21] Appl. No.: 19,139

[22] Filed: Mar. 9, 1979

[30] Foreign Application Priority Data

Mar. 28, 1978 [JP] Japan .............................. 53-40475[U]
Mar. 30, 1978 [JP] Japan .............................. 53-42296[U]

[51] Int. Cl.² .............................................. G06C 15/42
[52] U.S. Cl. ........................ 235/144 HC; 235/132 E; 235/144 SM
[58] Field of Search ................ 235/144 HC, 144 SM, 235/144 DM, 144 EA, 132 R, 132 E

[56] References Cited

U.S. PATENT DOCUMENTS

| | | | |
|---|---|---|---|
| 3,337,129 | 8/1967 | Johnson ................. | 235/133 |
| 3,627,228 | 12/1971 | Wolfe ..................... | 235/132 R |
| 3,777,973 | 12/1973 | Kundisch et al. ........... | 235/144 HC |
| 3,977,599 | 8/1976 | Bud et al. .................. | 235/144 HC |
| 4,028,530 | 6/1977 | Bud et al. .................. | 235/144 HC |
| 4,096,377 | 6/1978 | Prentice et al. ............ | 235/144 HC |

FOREIGN PATENT DOCUMENTS

| | | | |
|---|---|---|---|
| 44-9642 | of 1969 | Japan ................... | 235/144 HC |
| 46-15089 | of 1971 | Japan ................... | 235/144 HC |
| 47-5070 | of 1972 | Japan ................... | 235/144 HC |

Primary Examiner—Stephen J. Tomsky
Attorney, Agent, or Firm—Charles W. Helzer

[57] ABSTRACT

In a counter reset to zero by a push button and adapted to be mounted on a tape recorder or the like, there are provided a U shaped frame including a bottom plate, a pair of side plates, a spacer parallel with the side plates, a plurality of pinion aligning resilient members secured to the bottom plate, a digit wheel shaft supported by the side plates, a plurality of digit wheels rotatably mounted on the digit wheel shaft, and a driving gear rotatably mounted on the digit wheel shaft for driving a digit wheel of the lower most order. Each digit wheel comprises a heart shaped cam and a gear on one side and a carry pin gear on the other side. A zero resetting bracket is pivotally mounted on the frame and is provided with actuating members for actuating the heart shaped cams. The digit wheels are rotated by the source of drive of the tape recorder through the driving gear and each time a digit wheel of the lower order completes one revolution, a digit wheel of the higher order is rotated by one digit. A push button is mounted on either one of the side plates for simultaneously resetting to zero all digit wheels. In a modification a contact mechanism is provided for producing an electric signal which stops the operation of the tape recorder when the display of a digit wheel of the highest order changes from 9 to 0.

9 Claims, 11 Drawing Figures

COUNTERS RESET TO ZERO BY PUSH BUTTONS

BACKGROUND OF THE INVENTION

This invention relates to a counter reset to zero by a push button and adapted to be incorporated into a tape recorder and similar machine.

A tape recorder is usually provided with a counter reset to zero by a push button for the purpose of displaying the amount of run of the tape, or the recording time or the like. Such counter generally comprises a plurality of digit wheels each having a heart shaped cam, a plurality of pinions each interposed between adjacent digit wheels for transmitting or carrying the rotation of a digit wheels of a lower order to a digit wheel of a higher order, a reset push button, a zero resetting bracket provided with a plurality of heart shaped cam depressing members operated by the push button to depress the heart shaped cam members for simultaneously resetting the digit wheels to zero, a pulley connected to the source of drive of the tape recorder through a belt or the like, a rotary shaft having one end supporting the pulley and the other end provided with a worm, a worm wheel meshing with the worm, a motion transmitting pinion meshing with the gear of the digit wheel of the first order, and a gear meshing with the pinion. These component elements are assembled on a U shaped frame.

The counter reset to zero by the push button further comprises means mounted on the frame for determining the distances between the digit wheel shafts and the pinion shafts for the purpose of establishing a proper meshing relationship between the digit wheels, gears, carry pinions, and the motion transmitting pinion; pinion aligning means for resiliently holding and aligning the carry pinions and motion transmitting pinions which are freed when reset; a spacer interposed between the digit wheel of the first order and its driving gear for preventing the transmission of motion by friction between the gear and the digit wheel of the first order even when the counter is reset to zero during the operation of the tape recorder; and a stop member for preventing dropping off of the push button. As disclosed, for example, in Japanese Utility Model Publication No. 9642 of 1969 dated Apr. 18, 1969, of the tytle "Zero Reset Mechanism of a Zero Resettable Counter" the frame of an early stage push button zero reset counter was made of metal. However, a frame prepared by press working a metal plate is impossible to have various functions described above. For this reason, a large number of component parts are required which of course requires troublesome assembling steps. With the advance in material and metal mold manufacturing techniques, the frame of the counter has been molded from synthetic resinous materials. For example, Japanese Utility Model Publication No. 15089 of 1971 dated May 26, 1971 of the title "The Frame of the Push Button Type Zero Reset Counter" discloses a frame molded from a synthetic resinous material and intergrally formed with a groove for mounting a push button and stop member. Even with such molded frame, the difficulties described above are not eliminated completely. U.S. Pat. No. 3,777,973 dated Dec. 11, 1973 discloses a molded frame integrally formed with pinion aligning resilient members. Japanese Utility Model Publication No. 5070/72, dated Feb. 22, 1977 discloses an improved spacer which prevents frictional transmission of power between the digit wheel of the first order and its driving gear. U.S. Pat. No. 3,337,129 dated Aug. 22, 1967 discloses an improved assembly of a plurality of digit wheels and pinions. However, the techniques discloses in these prior references can not be applied to the counters of the push button zero resetting type. Thus, although these prior art devices were developed to solve independent problems they are not directed to radically improve the construction of the counter so as to obtain an ideal counter resettable with a push button and having a high degree of reliability that can be manufactured at a low cost.

In U.S. Pat. No. 3,627,228 assigned to the same assignee as the instant application there is disclosed a tape position marking and sensing device in which a tape recorder control signal is produced while a digit wheel of the highest order rotates from 0 to 9. However, the counter disclosed therein is not of the push button zero reset type. The construction of the digit wheels including the digit wheel of the highest order of this counter may be the same as that of the push button zero reset type so that it would be efficient if a signal producing means could be readily incorporated into this push button zero resetting type counter.

SUMMARY OF THE INVENTION

It is an object of this invention to provide an improved push button zero reset type counter which is much cheaper and reliable than prior art push button zero resetting type counters and is suitable to be incorporated into a tape recorder of the like machine.

Another object of this invention is to provide a novel push button zero reset type counter wherein nearly all component parts are made of molded synthetic resinous material.

Still another object of this invention is to provide a push button zero resetting type counter wherein several component parts are integrally molded thereby decreasing the number of the component parts, thus facilitating the assembling operation.

Yet another object of this invention is to provide a novel push button zero reset type counter capable of positively aligning pinions in a definite attitude when they are disengaged from the digit wheels at the time of zero resetting.

Another object of this invention is to provide a push button zero reset type counter wherein the assembly of the push button which is provided for resetting to zero the digit wheels, is simplified, thus preventing damage of the push button during assembling or exchange thereof.

A further object of this invention is to provide a push button zero resetting type counter wherein between the digit wheel of the highest order and the side plate of the frame is interposed a contact mechanism for producing an electrical signal that controls the operation of the tape recorder when the digit wheel of the highest order rotates from 9 to 0.

A still further object of this invention is to provide a novel push button zero reset type counter capable of mounting the zero resetting push button on the side plate of the frame even when the contact mechanism is interposed between the digit wheel of the highest order and the side plate of the frame.

According to this invention these and further objects can be accomplished by providing a counter reset to zero by a push button and adapted to be mounted on a tape recorder or the like machine, comprising a substantially U shaped frame including a substantiallly rectangular bottom plate, and a pair of upright side plates at the opposite ends of the bottom plate, the bottom plate including a spacer parallel with one side plate and provided with a notch at the upper end, a plurality of pinion aligning resilient members secured to the bottom plate, a pair of bearing members respectively positioned near the side plates, and a bearing cylinder near one side plate; each side plate being provided with a vertical groove, a shoulder on the inner surface of the side plate, a shaft opening provided on one side of the groove in alignment with the notch, a shoulder spaced a predetermined distance from the shaft opening; a digit wheel shaft journaled by the shaft openings of the side plates and extending through the notch of the spacer; a plurality of digit wheels rotatably mounted on the digit wheel shaft; a driving gear rotatably mounted on the digit wheel shaft between one side plate and a digit wheel of the lowermost order; each digit wheel being provided with a cam and a gear on one side and a carry pinion gear on the periphery on the other side; a zero resetting bracket including a base member, a pair of supports on the opposite ends of the base member, a plurality of cam actuating members projecting from the base member toward the lower side of the cams of respective digit wheels, a pair of pin shafts on the opposite sides of the pin shaft, the pin shafts being supported by the bearing members for rotatably supporting the zero resetting bracket, means for applying a bias to the zero resetting bracket for disengaging the cam actuating members from the cams of the digit wheels; a pinion shaft supported by the supports of the zero resetting bracket; a motion transmitting pinion and a plurality of carry pinions rotatably mounted on the pinion shaft, the motion transmitting pinion transmitting the rotation of the driving gear to the digit wheel of the lowermost order, and each carry pinion being interposed between adjacent digit wheels for rotating one digit wheel of the higher order when a digit wheel of the lower order completes one revolution, one end of the pinion aligning resilient members being disposed near the pinions; a zero resetting push button removably fitted in the groove of either one of the side plate, the push button being provided with a cam surface adapted to engage one end of the pinion shaft; and a driving shaft contained in the bearing cylinder for driving the driving gear.

BRIEF DESCRIPTION OF THE DRAWINGS

Further objects and advantages of the invention will be more readily understood from the following detailed description taken in conjunction with the accompanying drawings in which.

DESCRIPTION OF THE PREFERRED EMBODIMENTS

Figure 3:
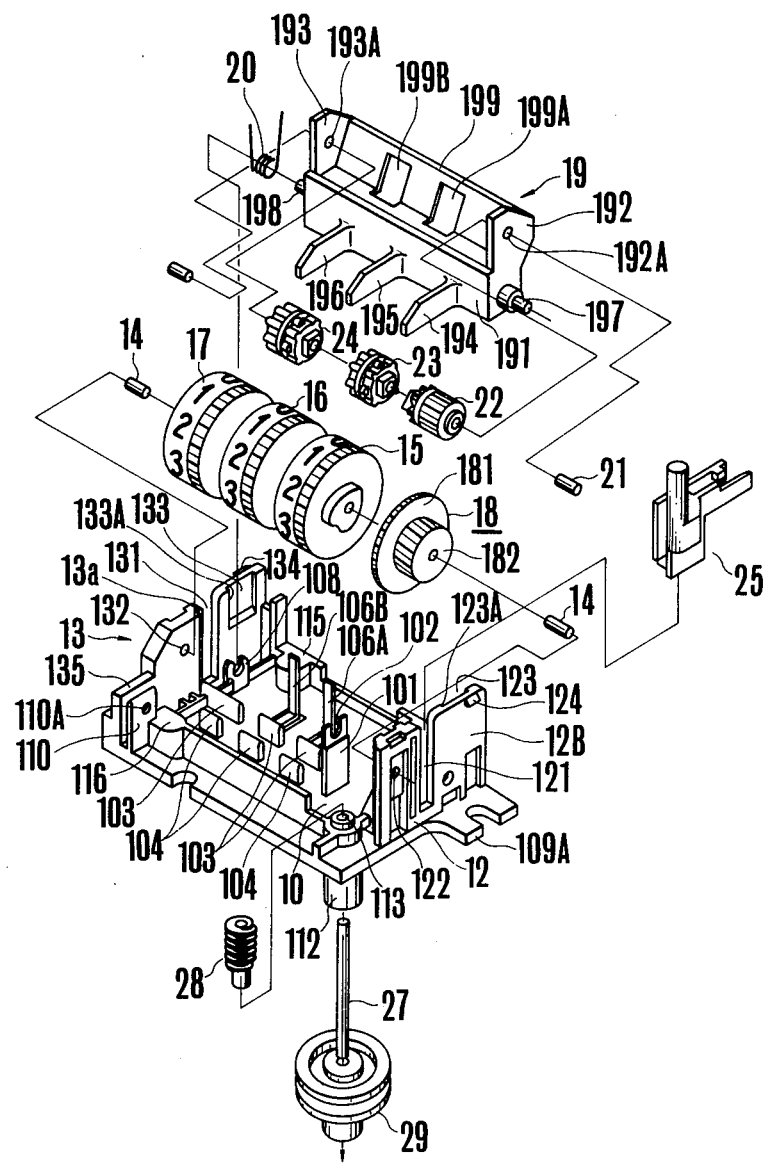
FIG. 3 is an exploded perspective view of the counter shown in FIG. 1.

In the following description, the terms "forward", "rearward", "upper", "lower" "right" and "left" show directions as viewed in FIG. 3.

Referring now to the accompanying drawings, the push button zero reset type counter of this invention comprises a frame 1 molded from a synthetic resinous material, a plurality of digit wheels 15, 16 and 17, a driving gear 18, a bracket 19 a plurality of pinions 22, 23 and 24 for driving the digit wheels, a push button 25, a worm 28 a pulley 29 all molded from the synthetic resinous material, and metal component parts including a digit wheel shaft 14, a pinion shaft 21 and coil springs 20 and 30.

Figure 4:
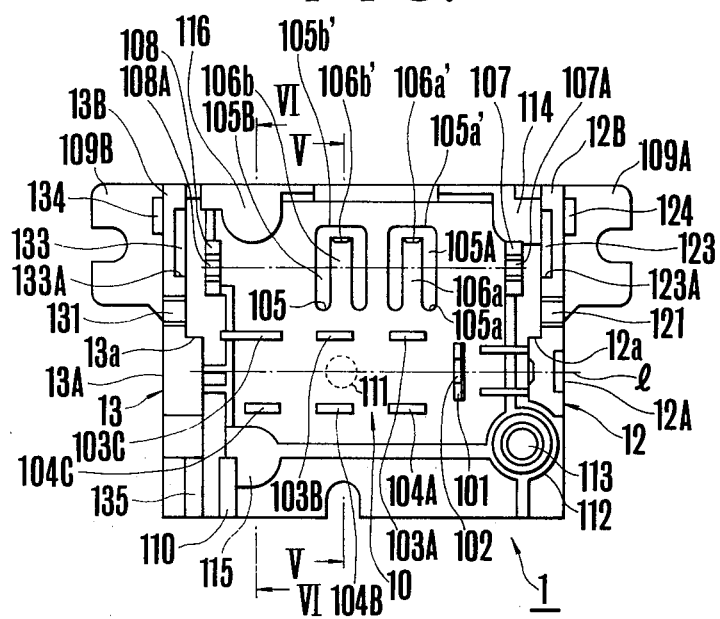
FIG. 4 is a front view of the frame of the counter.
Figure 5:
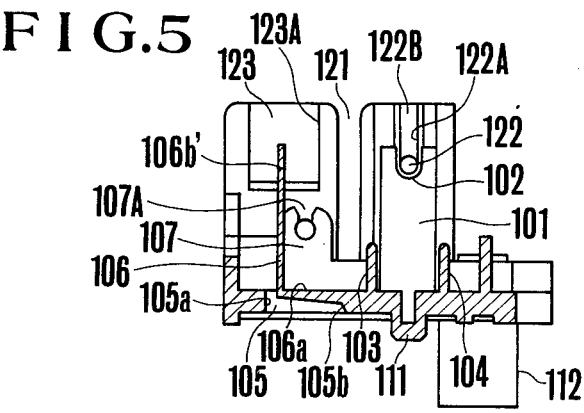
FIG. 5 is a sectional view taken along a line V—V in FIG. 4.
Figure 6:
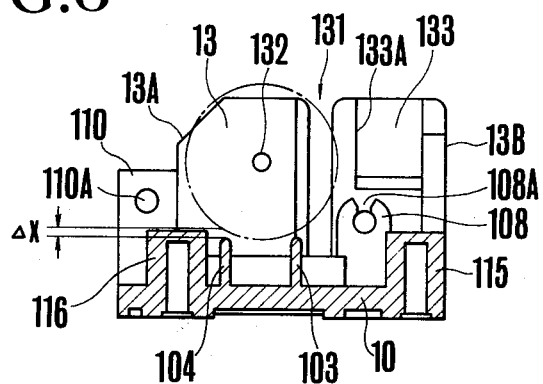
FIG. 6 is a sectional view taken along a line VI—VI in FIG. 4.

The frame 1 shown in detail in FIGS. 4 through 6 is generally U shape and comprises a rectangular bottom plate 10 and a pair of opposed parallel side plates 12 and 13 at the opposite end of the base plate 10. A upright spacer member 101 is provided on the upper surface of the bottom plate 10 at a position relatively close to the side plate 12 in parallel therewith and at about the center of the fore and aft direction of the bottom plate 10. The upper portion of the spacer member 101 is slightly offset toward the lefthand side plate 13 and a U shaped notch 102 is formed at the upper end. A plurality of upright projections 103A–103C and 104A–104C are provided on the opposite sides of a line 1 (FIG. 4) passing through the center of the U shape notch 102. These projections are arranged in a plurality of pairs. Slits 105A and 105B parallel with the side plates 12 and 13 are formed through the bottom plate 10 on the rear side of the first pair of projections 103A and 104A and the second pair of projections 103B and 104B, respectively. L shaped pinion aligning resilient members 106A and 106B are fitted in the slits 105A and 105B, respectively, comprising horizontal bases 106a and 106b extending between the front walls 105a and 105b and the rear walls 105a' and 105b', and vertical operating portions 106a' and 106b' near the rear walls 105a' and 105b'. This construction of the pinion aligning resilient members 106A and 106B increases the entire length by the length of the horizontal bases 106a and 106b in contrast to a case wherein the operating members 106a' and 106b' are projected directly from the base plate 10, thus providing a greater resiliency. The operating members 106a' and 106b' are shaped to have a semicircular cross-section for eliminating irregularities of the side edges thereof. A pair of bearing pedestals 107 and 108 are provided near the side plates 12 and 13 in parallel therewith and on a line traversing the slits 105A and 105B. At the upper ends of the bearing pedestals 107 and 108 are formed aligned semicircular bearing openings 107A and 108A. Mounting members 109A and 109B for mounting the counter on a tape recorder project beyond the side plates 12 and 13 at the rear portion of the base plate 10. A plated shaped support 110 for mounting a printed substrate to be described later is mounted on the base plate 10 at the front portion thereof and in parallel with the lefthand side plate 13. The support 110 is provided with an opening 110A which cooperates with a similar opening, not shown, of a projection 135 at the front end of the leftside plate 13 for securing the printed substrate when assembling a modified push button zero resetting type counter provided with an electric contact. The lower surface of the bottom plate 10 is formed with a dowel pin 111 on the line 1 passing through the notch 102 of the spacer 101 and between the second pair of projections 103B and 104B. A downwardly extending bearing cylinder 112 having a through opening 113 is formed on the lower side of the bottom plate 10 near the front end of the righthand side plate 12. Sleeves 114, 115 and 116 with downwardly opened blind openings are formed near three corners of the bottom plate 10 except the corner where the bearing cylinder 112 is provided, the sleeves 114, 115 and 116 being utilized to selectively cooperate with the mounting members when mounting the counter on the tape recorder.

The side plates 12 and 13 are provided with vertical grooves 121 and 131 at about the center of the width thereof and shaft openings 122 and 132 are provided for the fore halves 12A and 13A along the line passing through the notch 102 of the spacer 101. The fore halves 12A and 13A are offset inwardly as at 12a and 13a to form surfaces substantially flush with the outer surfaces of the bearing pedestals 107 and 108. The inner surface of the inwardly offset fore half 13A of the lefthand side plate 13 is flat. The diameter of the shaft opening 122 of the righthand side plate 12 is a little smaller than that of the shaft opening 132 of the lefthand side plate 13. A dish shaped recess 122A (see FIG. 5) with a portion of the upper side opened is provided for the inner surface of the inwardly offset fore half 12A of the righthand side plate 12 to surround the shaft opening 122. The upper opening of the recess 122A communicates with a vertical groove 122B having side walls inclined toward the bottom of the groove. Recesses 123 and 133 are provided for the inner surfaces of the rear halves of the side plates 12 and 13 divided by grooves 121 and 131, respectively, for forming shoulders 123A and 133A at portions spaced predetermined distances from the shaft openings 123 and 132. The spacing between the bottom walls of the recesses 123 and 133 is substantially equal to the distance between the fore halves 12A and 13A which are relieved for the purpose of preventing molding stress, particularly the distance between the outer surfaces where the shaft openings 123 and 132 are provided. Wedge shaped push button stop members 124 and 134 are formed on the outer edges of the upper surfaces near the rear end of the after halves 12B and 13B.

The length of the digit wheel shaft 14 is nearly equal to the distance between the outer surfaces of the side plates 12 and 13 and the diameter of the digit wheel shaft is a little smaller than the diameter of the shaft opening 132 but a little larger than that of the shaft opening 122. One end of shaft 14 is beveled.

The periphery of each digit wheel is printed with digit 0 through 9, and the righthand sides of the digit wheels 15, 16 and 17 are provided with heart shaped cams 151, 161 and 171 and gears 152, 162 and 172, respectively. Carry pin gears, not shown, are provided for portions of the lefthand peripheries of the digit wheels 15 and 16.

The driving gear 18 comprises a thin spur gear having the same diameter as the gears of respective digit wheels and a worm wheel 182 having a smaller diameter and secured to the righthand side of the spur gear. The total thickness of the driving gear 18 is substantially equal to the distance between the spacer 101 and the righthand side plate 12.

The zero resetting bracket 19 comprises a base 191 extending in the horizontal direction, a pair of upright supports 192 and 193 on the opposite ends of the base 191 and disposed in parallel with the side plates 12 and 13, a plurality of heart shaped cam depressing members 194, 195 and 196 projecting forwardly from the base 191 in parallel with the side plates 12 and 13, a rear wall 199 interconnecting the supports 192 and 193 on the rear side of the base 191 and pins 197 and 198 projecting from the opposite ends of the base 191. The supports 192 and 193 are provided with aligned shaft openings 192A and 193A. The rear wall 199 is provided with grooves 199A and 199B between the cam depressing members 194, 195 and 196.

The digit wheel shaft 14 is also used as the pinion shaft 21, the length thereof being determined by the distance between the recesses 123 and 133 of the side plates 12 and 13 and this distance is substantially equal to the spacing between the fore halves 12A and 13A of the side plates 12 and 13 provided with the shaft openings 122 and 132. The pinions comprise a motion transmitting pinion 22 and carry pinions 23 and 24. The motion transmitting pinion 22 comprises two adjoining gears having different number of teeth and a square boss on the righthand side. Each of the carry pinions 23 and 24 comprises two gears of different type and square bosses 231, 232, 241 and 242 on both sides. The righthand gear is provided with alternate long and short teeth extending in the axial direction. The square bosses of the pinions are slightly inclined toward the center for facilitating the removal of the molded pinion from the mold.

Figure 7:
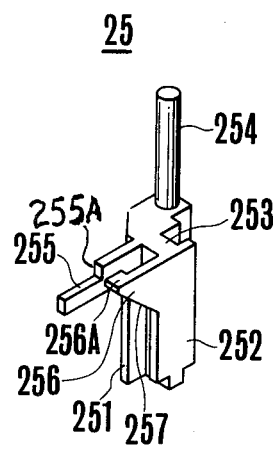
FIG. 7 is a perspective view showing a right-handed push button.
Figure 8:
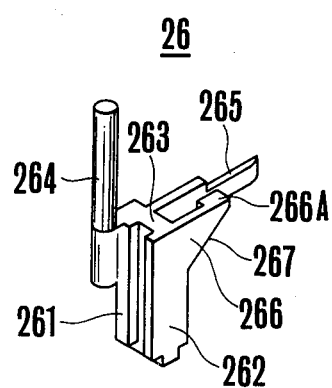
FIG. 8 is a perspective view showing a left-handed push button.

Either one of the right-handed push button 25 shown in FIG. 7 and the left-handed push button 26 shown in FIG. 8 is selected for mounting on the side plate 12 or 13. As shown in FIGS. 7 and 8, these push buttons 25 and 26 are symmetrical so that only the right-handed push button 25 will be described. This push button comprises a pair of parallel plate like legs 251 and 252 spaced a distance slightly larger than the thickness of the side plate 12, a web 253 interconnecting the legs 251 and 252 and having width substantially equal to the width of the groove 121 of the side plate 12, and an operating member 254 projecting from the upper portion of the leg 251. An arm 255 having a shoulder 255A is provided for the rear upper edge of the leg 251. The height of the shoulder 12a, is substantially equal to the height of the stop member 124 and the inner surface of the end of the arm 255 is beveled. The leg 252 is also provided with an arm 256 which is parallel with the arm 255, and a projection 256A having a length substantially equal to the depth of the recess 123 is provided at the end of the arm 252. An inclined cam surface 257 is formed on the lower surface of the arm 256. The thickness of the leg 252 is substantially equal to the height of the shoulder 12a, while the distance between the web 253 and the fore end of the leg 25 is substantially equal to the distance between the groove 121 and the shoulder 12a. The left-handed push button 26 has the same construction as the right-handed push button 25 so that various portions thereof are designated with reference numerals having the same last digits.

The worm member 28 is constructed as a bottomed cylinder having a central opening of the same diameter as that of the rotary shaft 27 and a worm formed on the outer periphery. The pulley 29 is provided with a peripheral groove for receiving a belt driven by a source of drive of the tape recorder.

To assemble the counter, the digit wheel 15 is mounted on the first pair of projections 103A and 104A, the digit wheel 16 on the second pair of projections 103B and 104B, and the digit wheel 17 on the third pair of projections 103C and 104C. Although the shaft openings of respective digit wheels 15, 16 and 17 are axially aligned, this axis is displaced downwardly by $a\chi$ from an axis passing through the shaft openings 122 and 132 of the side plates 12 and 13. The digit wheel shaft 14 is inserted into the shaft opening 132 from the outside of the side plate 13 beginning with the beveled end of the shaft 14. Then a coil spring 30 is mounted, and thereafter the shaft 14 is further inserted. Since the end of the digit wheel shaft 14 is beveled, it can be readily inserted through digit wheels 15, 16 and 17 without using any assembling jig. Further, the digit wheel shaft 14 is inserted into the shaft opening of the gear member 18 through the notch 102 of the spacer 101 to reach the shaft opening of the side plate 12. Thereafter, the shaft 14 is guided to the bottom of the groove 122B by the inclined side surface of the groove. Then the shaft 14 is fitted into the shaft opening 122 by being guided by the dish shaped recess 122A. When the digit wheel shaft 14 is depressed further it is supported between the shaft openings 122 and 132 of the side plates 12 and 13 thus rotatably supporting the digit wheels 15, 16 and 17 and the driving gear 18. A small gap is formed between the digit wheels and the upper ends of the projections 103 and 104 as shown in FIG. 6 to permit free rotation of the digit wheels. The digit wheels 15, 16 and 17 are urged toward the spacer 101 by the coil spring 30 thus adjusting side play. The digit wheel 15 and the driving gear 18 are separated by the spacer 101.

The pinion shaft 21 is supported by the supports 192 and 193 of the zero resetting bracket 19 with the opposite ends of shaft 21 extended beyond shaft openings 192A and 193A. On the pinion shaft 21 are rotatably mounted the motion transmitting pinion 22 and carry pinions 23 and 24. The zero resetting brack 19 is rotatably supported by the plate shaped bearing pedestals 107 and 108 by engaging pin shafts 197 and 198 with shaft openings 107A and 108A. The tip of the cam depressing member 194 of the bracket 19 rotatably supported in this manner extends to a portion beneath the heart shaped cam 151 of the digit wheel 15. In the same manner, the tips of the cam depressing members 195 and 196 extend to portions beneath the heart shaped cams 161 and 171 respectively of the digit wheels 16 and 17. The operating members 196a' and 106b' of the pinion aligning resilient members 106A and 106B extend upwardly through the grooves 199A and 199B of the rear wall 199. The projected end of the operating member 106a of the pinion aligning resilient member 106A is positioned behind the abutted square bosses 221 and 231 of the motion transmitting pinion 22 and the carry pinion 23 whereas the operating member 106b' of the pinion aligning resilient member 106B is positioned behind the abutted square bosses 222 and 241 of the carry pinions 23 and 24. As will be described later, each pinion is aligned to have a definite attitude by being urged by the pinion aligning resilient member. Although the periphery of the square boss of each pinion is inclined for facilitating mould release where the opposite surfaces of the pinion aligning resilient member are beveled, the square boss and the resilient member make a plane contact whereby the pinions are accurately aligned and generation of the noise caused by point contact can be prevented. The motion transmitting pinion 22 rotatably mounted on the pinion shaft 21 meshes with both the spur gear 181 of the driving gear 18 and the gear 152 of the digit wheel 181 to transmit rotation therebetween. On the other hand, the carry pinion 23 is locked since adjacent long teeth clamp the periphery of the digit wheel 15. Furthermore, the carry pinion 23 meshes with the gear 162 of the digit wheel 16 so that as the digit wheel 15 rotates one revolution, the carry pinion 23 is rotated a definite angle by the carry pin gear to rotate the digit gear by an angle corresponding to one digit. The carry pinion 24 is also locked since adjacent long teeth clamp the periphery of the digit wheel 16. Further, the carry pinion 24 engages the gear 192 of the digit wheel 17 so that the carry pinion 24 is rotated a definite angle by the carry pin gear as the digit wheel 16 rotates one revolution thus rotating the digit wheel 17 by an angle corresponding to one digit. The engagement between respective pinions, digit wheels and the driving gear is ensured because the opposite ends of the pinion shaft 21 engage the shoulders 123A and 133A of the recesses 123 and 133 of the side plates 12 and 13 so as to determine the distance between the axes of the pinion shaft 21 and the digit wheel shaft 14. The force that urges the pinion shaft 21 against shoulders 123A and 133A is provided by the coil spring 20 mounted on the pin shaft 198 between the support 242 and the bearing pedestal 108.

Figure 1:
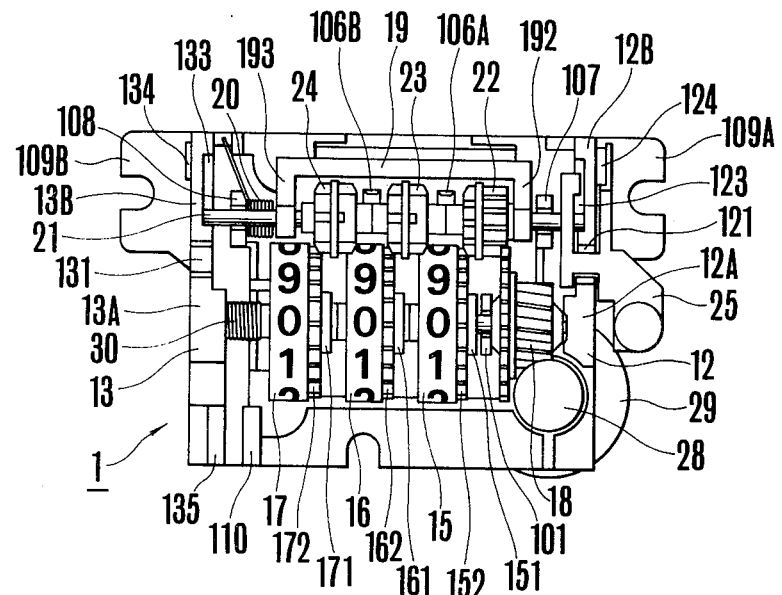
FIG. 1 is a front view showing one embodiment of a push button zero reset type counter according to this invention.
Figure 2:
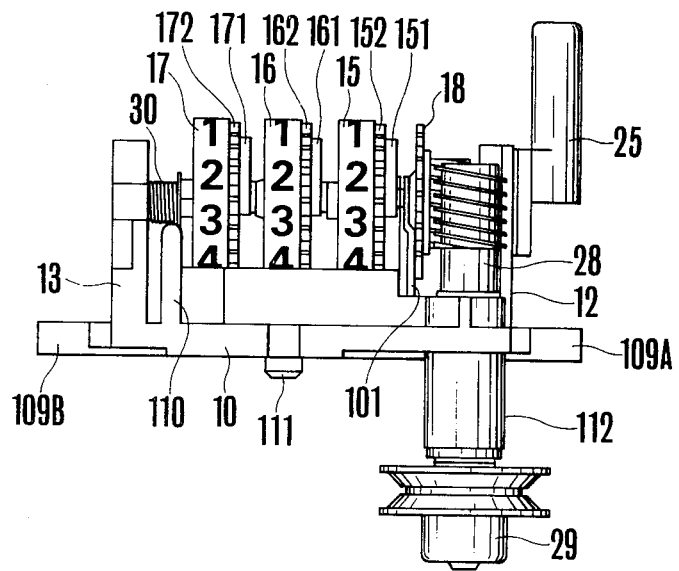
FIG. 2 is a bottom view of the counter shown in FIG. 1.

The right-handed push button 25 is incorporated into the frame 1 by inserting the leg 252 into the groove 121 with the leg 252 positioned inside of the side plate 12 whereas the left-handed push button 26 is incorporated into the frame 1 by inserting the leg 262 into the groove 131 with the leg 262 positioned inside of the side plate 13. As the push button 25 is inserted into the groove 121 the arm 255 comes to engage the stop member 124, but the arm 255 can move to a position beneath the stop while bent outwardly by the beveled tip and the resiliency of the material. By the engagement between the arm 255 and the lower edge of the stop member 124, removal of the push button 25 is prevented. The inclined cam surface 257 of the arm 256 of the leg 252 engages the end of the pinion shaft 21 projecting from the support 192, while the projection 256A is positioned in the recess 123 of the side plate 12, whereby drop out or jolting of the push button 25 is prevented even if a twisting force is applied thereto during the resetting operation as will be described later. As shown in FIG. 1, the side surface of the leg 252 of push button 25 and the inner surface of the fore half 12A of the side plate 12 are in the same plane. The left-handed push button 26 is mounted in the groove 131 of the side plate 13 in the same manner as the right-handed push button 25.

The rotary shaft 27 is contained in the bearing cylinder 112. The worm 28 is secured to the upper end of the bearing cylinder 132 and the pulley is secured to the lower end of the rotary shaft 27. The worm 28 meshes the worm wheel 182.

OPERATION

At the time of the recording and reproducing operation of the tape recorder, the pulley 29 is rotated in the counterclockwise directions and in the clockwise direction during the rewinding operation. The rotation of the pulley 29 is transmitted to the driving gear 18 through the worm 28 and the worm wheel 182. Thus, the driving gear 18 continuously rotates the digit wheel 15 through spur gear 181 transmitting pinion 22 and gear 152. As the digit wheel 15 rotates one revolution the carry pinion 23 is stepwisely rotated by the carry pin gear and the digit wheel 16 is rotated digit by digit by the carry pinion 23 and the gear 162. When the digit wheel 16 completes one revolution, the carry pinion 24 is rotated a definite angle by the carry pin gear thus rotating the digit wheel 17 digit after digit through carry pinion 24 and gear 172. This cycle of operation is repeated to display the integrated amount of the running of the tape by the digit wheels 15, 16 and 17.

Figure 9:
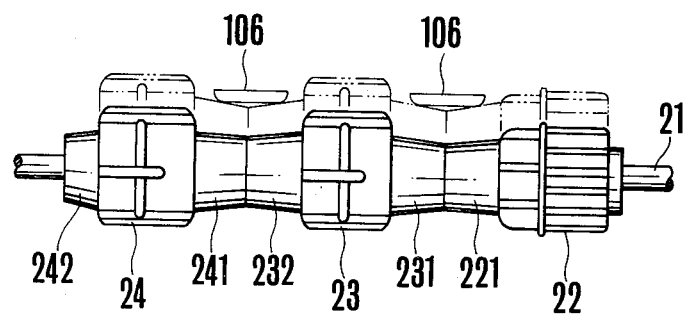
FIG. 9 is a side view useful to explain the aligning operation of pinions.

When it is desired to reset to zero the display on these digit wheels, the push button 25 is depressed. Normally, the push button 25 is urged against the stop 124 by the force of the coil spring 20 through the zero resetting bracket 19 and pinion shaft 21. When depressed, the push button 25 moves downwardly along the side plate 12 whereupon the inclined cam surface 256A of the arm 256 of the push button 25 rotates the pinion shaft 21 in the clockwise direction. Then, the zero resetting bracket 19 rotates about the bearing pedestals 107 and 108 in the clockwise direction against the force of the coil spring 20. By the rotation of the bracket 19, the opposite ends of the pinion shaft 21 disengage the shoulders 123A and 133A of the side plates 12 and 13 while rotating in the clockwise direction, thus disengaging the gears of the digit wheels 15, 16 and 17 and the driving gear 18 from pinions 22, 23 and 24. Due to the rotation of the bracket 19, the cam depressing members 194, 195 and 196 depress the heart shaped cams 151, 161 and 171 of respective digit wheels 15, 16 and 17 which are now free to rotate so as to simultaneously reset to zero these digit wheels. Then, the pinion aligning resilient members 106A and 106B act upon the motion transmitting pinion 22 and the carry pinions 23 and 24 which have been disengaged from the gears 152, 162 and 172 of respective digit wheels and are now free to rotate. In FIG. 9, pinions 22, 23 and 24 shown by solid lines are in engagement with the gears of respective digit wheels, but these pinions are moved to the dotted line position by the operation described above. The pinion aligning resilient members 106A and 106B engage abutted square bosses 221, 231, 232 and 241 of the retracted pinions 22, 23 and 34 so that the pinion aligning resilient members flex, thus applying a strong force upon the square bosses to align the pinions in a definite attitude.

When the push button 25 is released, the zero resetting bracket member 19 is rotated in the counterclockwise direction about the bearing pedestals 107 and 108 by the force of the coil spring 20. This rotation is stopped when the opposite ends of the pinion shaft 21 projecting beyond the supports 192 and 193 come to engage the shoulders 123A and 133A of the recesses 123 and 133. Then, the pinion shaft 21 and the digit wheel shaft 14 are again maintained at a suitable distance to engage again pinions 22, 23 and 24 with the gears of respective digit wheels 15, 16 and 17 and with the driving gear 18.

Even when the zero resetting operation is performed while the pulley 29 is rotating, due to the presence of the spacer the rotation of the driving gear 18 would not be transmitted to the digit wheel 15 thus preventing unwanted rotation thereof.

Figure 11:
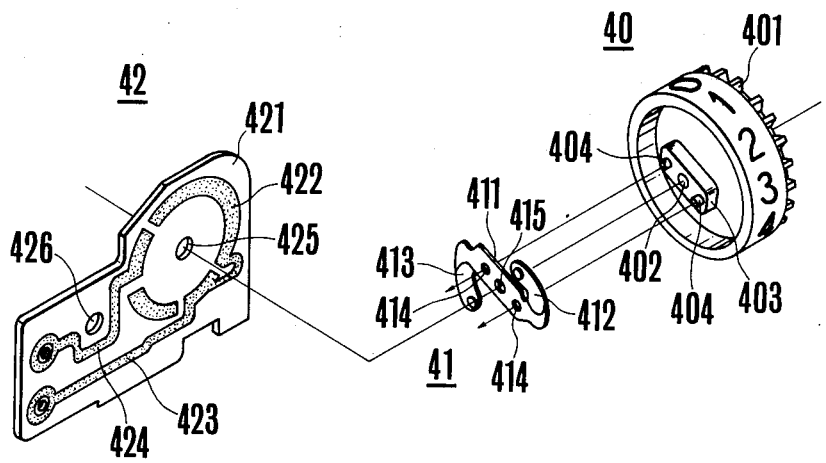
FIG. 11 is an exploded perspective view showing a contact mechanism.
Figure 10:
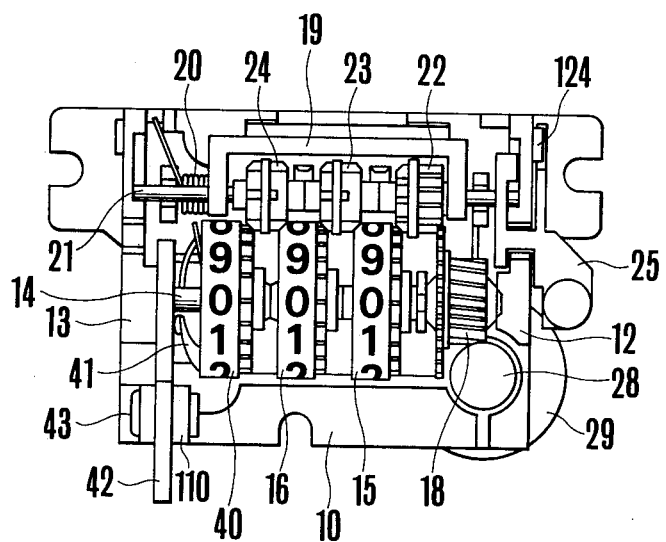
FIG. 10 is a front view showing another embodiment of this invention.

FIGS. 10 and 11 illustrate another embodiment of the push button zero reset type counter of this invention which is provided with one electric contact for producing a signal adapted to automatically stop the tape recorder during the procedure in which the display of the digit wheel of the highest order changes 0 through 9. This modification is identical to the first embodiment except the contact mechanism so that corresponding elements are designated by the same reference characters and their description is omitted.

The contact mechanism comprises a wiper 41 on the lefthand side of the digit wheel 40 of the highest order and a printed substrate 42 secured to the inner surface of the the lefthand side plate 13. The digit wheel 40 is provided with a heart shaped cam, not shown, and a gear 401 on its right side and printed with digits 0 through 9 on the periphery. A wiper mounting block 403 having a shaft opening 402 at the center and a pair of dowel pins 404 is secured to the lefthand side of the digit wheel 40. Of course, the wiper 21 is made of a metal sheet and includes a body 411 having substantially the same configuration as the mounting block 403 and a pair of curved fingers 412 and 413 extending from the opposite ends of the body 411 toward the lefthand side plate 13. The body 411 is formed with small openings 414 for receiving the dowel pins 404 and an opening 415 through which the digit wheel shaft 14 extends. The wiper 41 is mounted on the mounting block 403 by fitting the dowel pins 404 into the openings 414. Then the ends of the dowel pins 404 are heat calked to secure the wiper 41 to the digit wheel 40. The printed substrate 42 comprises an insulating board 421 having a thickness substantially equal to the spacing between the projection 135 near the fore end of the side plate 13 and the mounting member 100 for the printed substrate, and a conductor printed on the righthand side surface of the insulating board. The conductor comprises an annular portion 422 along a circle about an opening 425, the fingers 412 and 413 of the wiper being moved along the annular portion, and a pair of terminal portions 423 and 424 extending from the annular portion toward left. The digit wheel shaft 14 extends through the opening 425. The printed substrate 42 is provided with a calking pin opening 426 for receiving a calking pin 43, the distance between openings 425 and 426 being equal to the distance between the shaft opening 132 of the side plate 13 and a calking pin opening through the projection 135 at the fore end.

Before assembling the digit wheels, the printed substrate 42 is clamped between the profection 135 and the printed substrate mounting member 110 on the inside of the side plate 13 with the shaft opening 132 and the opening 425 aligned and with the calking pin opening of the projection 135 and the calking pin opening 426 aligned. Thereafter, the digit wheels are assembled by inserting the digit wheel shaft 14 from the outside of the side plate 13. At this time, since the printed substrate 42 is merely clamped between the projection 135 and the mounting member 110, it can be readily adjusted when the shaft opening 132 and the opening 425 are not aligned. After assembling the digit wheels, the calking pin 43 is fitted in the calking pin openings of the projection 135, the printed substrate 42, and the mounting member 110 and the opposite ends of the calking pin 44 are calked to secure the printed substrate 42 to the frame 1. With this construction, since the printed substrate is calked at only one position it is possible to make the diameter of the opening 425 for the digit wheel shaft 14 to be substantially equal to the diameter of the digit wheel shaft, thus accurately positioning the wiper 41 and the conductor portion 422. Although the fore end of the printed substrate 42 extends near the groove 131 of the side plate 13, a suitable gap is defined between the printed substrate 42 and the side plate 13 by the shoulder 13a. As this gap is nearly equal to the thickness of the leg 262 of the push button 26, the push button 26 can be mounted on the side plate 13 without any trouble. In the modified counter shown in FIGS. 9 and 10, as the resiliency of the fingers 412 and 413 of the wiper 41 is used, the coil spring 30 provided for the purpose of adjusting the side play of the digit wheels is not used.

It should be understood that the invention is not limited to the specific embodiments described above and that many changes and modifications will be obvious to one skilled in the art without departing from the scope of the invention as defined in the appended claims.

What is claimed is:

1. A counter reset to zero by a push button and adapted to be mounted on a tape recorder or the like machine, comprising a substantially U shaped frame including a substantially rectangular bottom plate, and a pair of upright side plates at the opposite ends of said bottom plate;

said bottom plate including a spacer parallel with one side plate and provided with a notch at the upper end, a plurality of pinion aligning resilient members secured to said bottom plate, a pair of bearing members respectively positioned near said side plates, and a bearing cylinder near one side plate;

each side plate being provided with a vertical groove, a shoulder on the inner surface of the side plate, a shaft opening provided on one side of said groove in alignment with said notch, a shoulder spaced a predetermined distance from said shaft opening;

a digit wheel shaft journalled by the shaft openings of said side plates and extending through the notch of said spacer;

a plurality of digit wheels rotatably mounted on said digit wheel shaft;

a driving gear rotatably mounted on said digit wheel shaft between one side plate and a digit wheel of the lower most order;

each digit wheel being provided with a cam and a gear on one side and a carry pin gear on the periphery on the other side;

a zero resetting bracket including a base member, a pair of supports on the opposite ends of said base member, a plurality of cam actuating members projecting from said base member toward the lower side of said cams of respective digit wheels, a pair of pin shafts on the opposite sides of said base member, said pin shafts being supported by said bearing members for rotatably supporting said zero resetting bracket, means for applying a bias to said zero resetting bracket for disengaging said cam actuating members from said cams of said digit wheels;

a pinion shaft supported by the supports of said zero resetting bracket;

a motion transmitting pinion and a plurality of carry pinions rotatably mounted on said pinion shaft, said motion transmitting pinion transmitting the rotation of said driving gear to the digit wheel of the lower most order, and each carry pinion being interposed between adjacent digit wheels for rotating a digit wheel of the upper order when a digit wheel of the lower order completes one revolution;

one end of said pinion aligning resilient members being disposed near said pinions;

a zero resetting push button removably fitted in the groove of either one of the side plates, said push button being provided with a cam surface adapted to engage one end of said pinion shaft, and a driving shaft contained in said bearing cylinder for driving said driving gear.

2. The counter according to claim 1 wherein said bottom plate further comprises a plurality of pairs of parallel projections disposed between said spacer and said other side plate, each pair being positioned beneath each digit wheel with a small gap therebetween.

3. The counter according to claim 1 wherein each carry pinion is provided with square bosses on both sides, the number of the pinion aligning resilient members is smaller than the number of digit wheels by one, and the free end of each pinion aligning resilient member terminates close to the abutted square bosses of adjacent carry pinions.

4. The counter according to claim 1 wherein the diameter of the shaft opening of one side plate is slightly smaller than the diameter of the digit wheel shaft received in said shaft opening and the diameter of the shaft opening of the other side plate is slightly larger than the diameter of said digit wheel shaft, and wherein a semicircular dish shaped recess with upper opened portion is provided for the inner surface of said one side plate to surround the shaft opening thereof, the opened upper portion communicating with a vertical groove of said one side plate, the side walls of said groove being inclined toward the bottom of said groove.

5. The counter according to claim 1 wherein the portions of the side plates of the frame in which the shaft openings for supporting the opposite ends of said digit wheel shaft are formed are offset inwardly, so as to make equal the lengths of said pinion shaft supported by the shaft openings of the supports of said zero resetting bracket and of the digit wheel shaft supported by the shaft openings of said side plates.

6. The counter according to claim 1 wherein a wedge shaped stop member is formed near the upper rear edge on the outside of one side plate, and said push button comprises a first leg adapted to slide along the outer surface of said one side plate, a second leg adapted to slide along the inner surface of said one side plate and having an inclined cam surface engaging one end of said pinion shaft, a web interconnecting said legs and adapted to fit in the vertical groove of said one side plate, an actuating member projecting from the upper end of said first leg, and an arm extending rearwardly from said first leg along the outer surface of said one side plate, said arm engaging said wedge shaped stop member to lock said push button when it is inserted.

7. The counter according to claim 6 wherein said push button is constructed as lefthanded or righthanded type and selectively mounted on either one of said side plates of the frame.

8. A counter reset to zero by a push button and adapted to be mounted on a tape recorder or the like machine comprising;

a substantially U shaped frame made of a synthetic resin and including a rectangular bottom plate, and parallel upright side plates on the opposite ends of said bottom plate;

said bottom plate including a plate shaped spacer located close to one side plate in parallel therewith and provided with a U shaped notch at its upper end, a plurality of parallel slits located near the rear side of said bottom plate in parallel with said side plates, a plurality of L shaped pinion aligning resilient members having horizontal legs received in said slits and vertical legs near the rear wall of said frame, a pair of bearing pedestals located on the opposite sides of said slits and near said side plates, each bearing pedestal having a semicircular shaft opening at its upper end, a plate shaped projection provided on the fore end of said bottom plate near the other side plate with a small gap therebetween, said plate shaped projection being provided with an opening, and a bearing cylinder extending through said bottom plate near the front end of said one side plate;

each one of said side plates being provided with a vertical groove at its center to divide it into fore and aft halves, the fore half being provided with a shaft opening in axial alignment with the notch of said spacer, and the aft half being provided on its inner surface with a shoulder spaced a predetermined distance from said shaft opening and a wedge shaped push button stopping member near the upper edge of the outer surface of said side plate; the fore half of the other side plate being provided with an opening near the fore end thereof in alignment with the opening of said projection;

a digit wheel shaft journalled by the shaft openings of said side plates and extending through the notch of said spacer;

a plurality of digit wheels made of a synthetic resin and rotatably mounted on said digit wheel shaft;

a driving gear made of a synthetic resin and rotatably mounted on said digit wheel shaft between a digit wheel of the lower most order and said spacer, each digit wheel except a digit wheel of the highest order being provided with a heart shaped cam and a gear on one side thereof, and a carry pinion gear on the periphery on the other side, said digit wheel of the highest order being provided with a heart shaped cam and a gear on one side and a wiper on the other side, said drive gear comprising a spur gear having the same diameter as the gears of respective digit wheels and a worm wheel having a diameter smaller than that of said spur gear;

a zero resetting bracket rotatably supported by said bearing pedestals, said bracket including a base member having a length slightly shorter than the distance between said bearing pedestals, pin shafts extending from the opposite ends of said base member and received in the shaft openings of said bearing pedestals, a pair of vertical supports on the opposite ends of said base member and provided with aligned shaft openings, a plurality of heart shaped cam depressing members projecting from the fore side of said base member and extending in parallel with said side plates to portions beneath the heart shaped cams of respective digit wheels, the number of said heart shaped cam depressing members being equal to the number of said digit wheels;

spring means mounted on one of the pin shafts between the other side plate and one bearing pedestal for urging said zero resetting bracket to rotate to separate said heart shaped cam depressing members away from corresponding heart shaped cams of respective digit wheels;

a pinion shaft extending through the shaft openings of the supports of said zero resetting bracket, the opposite ends of said pinion shaft abutting the shoulders on the inner surfaces of said side plates to determine the distances of said side digit wheel shaft and said pinion shaft;

a motion transmitting pinion made of a synthetic resin and rotatably mounted on said pinion shaft;

a plurality of carry pinions made of a synthetic resin and rotatably mounted on said pinion shaft;

said motion transmitting pinion being interposed between the digit wheel of the lower most order and said driving gear and provided with a first gear meshing the spur gear of said driving gear and a second gear meshing the gear of said digit wheel of the lower most order;

each carry pinion being interposed between adjacent digit wheels for locking a digit wheel of the lower order and for meshing with the gear of a digit wheel of the higher order so as to rotate one digit the digit wheel of the upper order when the digit wheel of the lower order completes one revolution; the free ends of said pinion aligning resilient members being normally positioned near the backs of respective carry pinions;

a zero resetting push button made of a synthetic resin and slidably fitted in the vertical groove of either one of the side plates and locked by said wedge shaped stop member, the inner surface of said push button being formed with a cam surface adapted to engage the end of said pinion shaft projecting beyond the support of said zero resetting bracket;

a drive shaft extending through said bearing cylinder of said bottom plate, said drive shaft being provided at its upper end with a worm meshing with the worm wheel of said drive gear, and a pulley at its lower end, said pulley being connected to a drive source of said tape recorder through a belt;

a printed substrate located along the inner surface of the other side plate, said printed substrate being provided with a shaft opening through which said digit wheel shaft extends, an annular contact member concentric with said shaft opening, said wiper secured to the digit wheel of the highest order sliding along said annular contact member for producing a signal which stops the operation of said tape recorder when the display of said digit wheel of the highest order rotates changes from 9 to zero, said printed substrate having a thickness substantially equal to the spacing between said projection and said other side plate so as to clamp said substrate therebetween, said printed substrate being provided with an opening aligned with the opening of said other side plate and the opening of said projection, and said printed substrate being secured to said frame by a calked pin extending through the openings of said other side plate, said projection and said substrate.

9. The counter according to claim 8 wherein the fore half of said other side plate is provided with a shoulder on its inner surface, the thickness of the edge of said shoulder along said groove being decreased, and wherein said push button comprises a first leg adapted to slide along the outer surface of one of the side plates, a second leg adapted to slide along the inner surface of said one side surface and provided with an inclined cam surface adapted to engage one end of said pinion shaft, a web interconnecting said first and second legs and adapted to be fitted in the vertical groove of said one side plate, an operating member projecting from said first leg, and an arm rearwardly extending from said first leg along the outer surface of said one side plate, said second leg having a thickness nearly equal to the height of the shoulder of said one side plate.

* * * * *